M. S. YOUNG.
FLEXIBLE DRIVE MOUNTING.
APPLICATION FILED APR. 15, 1915.
1,168,139.
Patented Jan. 11, 1916.
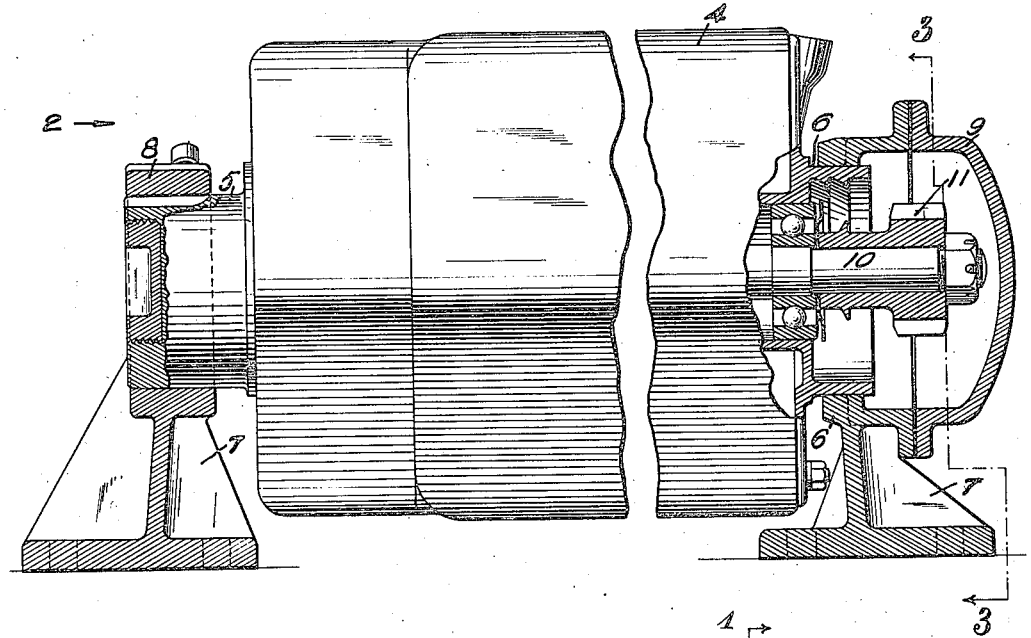
Fig. 1.
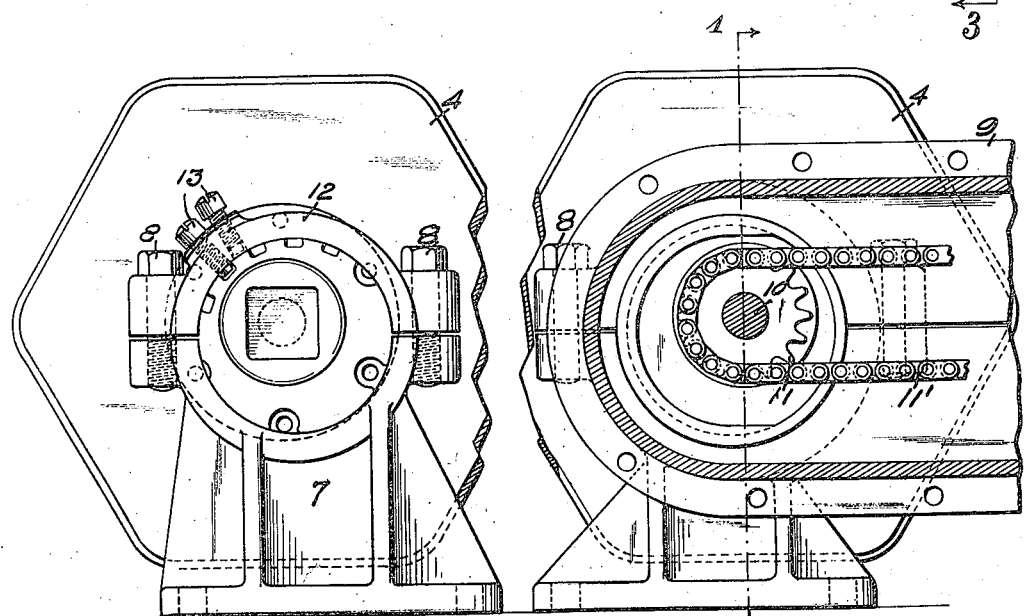
Fig. 2.
Fig. 3.
WITNESSES
Fred Berger
B. Joffe
INVENTOR
M. S. Young.
BY
ATTORNEYS

UNITED STATES PATENT OFFICE.

MILLARD S. YOUNG, OF DETROIT, MICHIGAN.

FLEXIBLE-DRIVE MOUNTING.

1,168,139.   Specification of Letters Patent.   Patented Jan. 11, 1916.

Application filed April 15, 1915. Serial No. 21,494.

*To all whom it may concern:*

Be it known that I, MILLARD S. YOUNG, a citizen of the United States, and a resident of Detroit, in the county of Wayne and State of Michigan, have invented a new and Improved Flexible-Drive Mounting, of which the following is a full, clear, and exact description.

My invention relates to flexible-drive mountings, and has reference more particularly to the chain- or belt-drive machines, as used in automobile engines for generators or starters.

The object of the invention is to provide a simple, efficient and inexpensive flexible-drive mounting which will constitute a support for the drive wherein the drive can be displaced to obtain the tightening of the flexible transmission member without any disturbance of the parallelism of said drive with reference to the mechanism driven therefrom.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a drive embodying my invention partly in section to show the details of construction; Fig. 2 is an end view in the direction of the arrow 2 shown in Fig. 1; and Fig. 3 is a section on line 3—3, Fig. 1.

Before proceeding to a more detailed description of my invention, it must be clearly understood that although the structure herein described and shown is mainly intended for use with generators and motors used on motor vehicles, the same can be as efficiently utilized with any flexible drive where the parallelism of the motor with the mechanism driven therefrom should be maintained.

The usual way of supporting the generator or motor on a motor vehicle is by setting the generator or motor directly on the bracket or lug of the crank case, and the adjustment of the flexible transmission of the motor can only be obtained by a displacement of the motor or generator casing, and since the displacement is only possible by the sliding, raising, or some similar displacement, of the generator or motor it becomes impossible to maintain the shaft of the motor or generator parallel with the shaft to be driven therefrom. To obviate the above defects, I provide my generator or motor casing 4 with co-axial trunnions 5 and 6 each projecting laterally from the opposite ends or heads of the casing. The trunnion 5 engages a split bearing bracket 7, the bolts 8 of which clamp the trunnion within the bearing. A similar bracket 7 engages the trunnion 6. A flexible transmission guard 9 is associated with said bracket 7 engaging the trunnion 6.

The armature shaft 10 of the generator or motor which carries the sprocket 11 is eccentric with the trunnions 5 and 6. To tighten the flexible transmission member 11′ engaging the sprocket 11, the bolts 8 of the split bearing brackets 7 are loosened, thus releasing their grip on the trunnions 5 and 6. By turning the casing 4 the armature shaft 10 will be displaced with its sprocket 11 relatively to the sprocket carried by the driven shaft and parallelly to the driven shaft, because the two trunnions are displaced simultaneously by the displacement of the casing 4. By clamping the bolts 8 of the split bearing brackets the casing will be clamped in a displaced position, and, therefore, the armature shaft maintained in displaced position.

To prevent any accidental displacement of the trunnions within their split bearings 7, the trunnion 5 is provided with slots 12 on its lateral surface, which are engageable by screws 13 provided in the body of the split bearing bracket 7, whereby said trunnion 5 is keyed within the bracket, in addition to being clamped therein. It is self-evident that when it is desired to rotate the trunnion within the split bearing, the screw 13 engaging the groove 12 must be first disengaged therefrom.

From the above description it will be seen that in my structure the shaft is mounted in a casing having eccentric heads or trunnions displaced simultaneously, whereby the shaft within the casing is displaced bodily and parallelly to itself.

While I have described the principle of operation, together with the device which I now consider to be the best embodiment thereof, I desire to have it understood that the device shown is merely illustrative and that such changes may be made as are within the scope of the appended claims.

I claim:

1. In a flexible-drive mounting, the combination of a motor casing including a motor shaft, trunnions projecting from the ends of the casing eccentric with the motor shaft, split bearing brackets for said trunnions wherein the casing may be turned and thereby the motor shaft displaced parallel to itself, and means associated with said brackets for clamping said trunnions therein to retain the casing in displaced position.

2. In a flexible-drive mounting, the combination of a motor shaft, a casing therefor having trunnions eccentric with the shaft, supporting brackets for the trunnions in which the trunnions are mounted to rotate, and means for locking said trunnions in the brackets in predetermined positions.

3. In a flexible-drive mounting, the combination of a motor shaft, a revoluble casing for the shaft having trunnions eccentric with said shaft, supporting brackets engaging the trunnions, said trunnions being adapted to revolve simultaneously in their brackets, whereby the shaft can be displaced parallelly to itself, and means for locking said trunnions in the brackets so that the casing cannot displace itself accidentally as the shaft is revolved.

In testimony whereof I have signed my name to this specification in the presence of two subscribing witnesses.

MILLARD S. YOUNG.

Witnesses:
  JOHN H. O'BRIEN,
  E. H. DELANEY.